United States Patent [19]
Luo et al.

[11] Patent Number: 6,081,751
[45] Date of Patent: Jun. 27, 2000

[54] SYSTEM AND METHOD FOR CLOSED LOOP AUTOTUNING OF PID CONTROLLERS

[75] Inventors: Rongfu Luo; S. Joe Qin; Dapang Chen, all of Austin, Tex.

[73] Assignee: National Instruments Corporation, Austin, Tex.

[21] Appl. No.: 09/054,556

[22] Filed: Apr. 3, 1998

Related U.S. Application Data

[60] Provisional application No. 60/068,282, Dec. 19, 1997.

[51] Int. Cl.⁷ .................................................. G05B 11/36
[52] U.S. Cl. ............................... 700/42; 700/39; 700/52; 700/72
[58] Field of Search .................................. 700/28, 42, 40, 700/43, 41, 52, 61, 63, 39, 72, 29, 38, 44, 45, 46, 67, 71, 69, 53, 54

[56] References Cited

U.S. PATENT DOCUMENTS

| | | |
|---|---|---|
| 4,549,123 | 10/1985 | Hägglund et al. . |
| 4,675,805 | 6/1987 | Freymann ................................. 700/42 |
| 4,754,391 | 6/1988 | Suzuki ...................................... 700/37 |
| 4,758,943 | 7/1988 | Aström et al. . |
| 5,043,862 | 8/1991 | Takahashi et al. ....................... 700/42 |
| 5,229,669 | 7/1993 | Chu et al. ................................ 318/610 |
| 5,283,729 | 2/1994 | Lloyd ....................................... 700/37 |
| 5,453,925 | 9/1995 | Wojsznis et al. ........................ 700/37 |
| 5,587,899 | 12/1996 | Ho et al. .................................. 700/37 |
| 5,742,503 | 4/1998 | Yu ............................................ 700/42 |
| 5,748,467 | 5/1998 | Qin et al. . |
| 5,818,714 | 10/1998 | Zou et al. ................................. 700/34 |
| 5,867,384 | 2/1999 | Drees et al. ............................. 700/42 |
| 5,997,778 | 12/1999 | Bulgrin ................................... 264/40.1 |

OTHER PUBLICATIONS

Tor Steinar Schei, "A Method for Closed Loop Automatic Tuning of PID Controllers", 1992, International Federation of Automatic Control, pp. 587–591.

*Primary Examiner*—Joseph E. Palys
*Assistant Examiner*—Rijue Mai
*Attorney, Agent, or Firm*—Conley, Rose & Tayon P.C.; Jeffrey C. Hood

[57] ABSTRACT

A system and method for automatically tuning a PID controller resident within a PID control loop. The PID control loop includes a PID controller and a process. The process supplies a process variable which is compared to the loop input. The result of the comparison is supplied to the PID controller, and the PID controller drives the process. A relay is applied to the loop input. The relay compares a set point value to the process variable. If the set point value is greater than the process variable, the relay drives the loop input with a first amplitude value. If the set point value is less than the process variable, the relay drives the loop input with a second amplitude value. In response to the set point relay, the process variable develops a sustained oscillation. The period and amplitude of the sustained oscillation are measured. A new set of PID controller parameters are calculated from the period and amplitude of sustained oscillation. In particular, the oscillation period and amplitude are used to calculated a time constant and dead time for a standard process model. The time constant and dead time are used to calculate the new PID controller parameters either (a) directly through the formulae associated with the Ziegler-Nichols reaction curve method, or (b) through the intermediate step of calculating an ultimate period and frequency from the time constant and deadtime.

13 Claims, 14 Drawing Sheets

PID Control Loop

Control Loop Configured for Relay Feedback Based Auto-tuning

PID Autotuning According to the Method of Schei

PID Auto-tuning of the Present Invention

A First Embodiment of the PID Autotuning System of the Present Invention

A Second Embodiment of the PID Autotuning System of the Present Invention

Process Under PID Control with Setpoint Relay

Setpoint Relay (the existing controller is proportional-only)

Relay Feedback

Setpoint Relay (the existing controller is of PI type)

Step Response Comparison $G_p(s) = 2e^{-3s}/(10s+1)$,
existing controller : $K_c = 1, T_i = \infty$;

$G_p(s) = 2e^{-3s}/(15s+1)$,
existing controller : $K_c = 1, T_i = \infty$;

$G_p(s) = 2e^{-5s}/(10s+1)$,
existing controller : $K_c = 1, T_i = \infty$;

$G_p(s) = 2e^{-3s}/(10s+1)(7s+1)$,
existing controller : $K_c = 1, T_i = \infty$;

Step Response Comparison $G_p(s) = 2e^{-3s}/(10s+1)$,
existing controller : $K_c = 0.2, T_i = 2Sec$;

$G_p(s) = 2e^{-3s}/(15s+1)$,
existing controller : $K_c = 0.2$,
$T_i = 2Sec, T_d = 0.8 Sec, \alpha = 0.1$;

$G_p(s) = 2e^{-5s}/(10s+1)$,
existing controller : $K_c = 0.2, T_i = 2 Sec$;

$G_p(s) = 2e^{-3s}/(10s+1)(7s+1)$,
existing controller : $K_c = 0.5, T_i = 10 Sec$,
$T_d = 0.8 Sec, \alpha = 0.1$;

Step response comparison: Process $G_p(s) = 200e^{-3s}/(10s+1)$,
existing controller: $K_c = 0.2, T_i = 2$ Sec.

Comparison of estimated ultimate gain and ultimate period when the existing controller is proportional-only. The controller gain is constant.

| Process | $G_p(s) = \dfrac{2e^{-3s}}{15s+1}$ | $G_p(s) = \dfrac{2e^{-5s}}{10s+1}$ | $G_p(s) = \dfrac{2e^{-3s}}{(10s+1)(7s+1)}$ |
|---|---|---|---|
| Relay Feedback | $K_u = 3.52$ | $K_u = 1.62$ | $K_u = 2.99$ |
|  | $T_u = 11.0 \text{ sec}$ | $T_u = 16.3 \text{ sec}$ | $T_u = 22.8 \text{ sec}$ |
| Setpoint Relay | $K_u = 3.8$ | $K_u = 1.85$ | $K_u = 2.96$ |
| (Controller gain=1) | $T_u = 11.2 \text{ sec}$ | $T_u = 17.0 \text{ sec}$ | $T_u = 23.4 \text{ sec}$ |

Fig. 11a

The controller gain is changed (results from feedback relay are: $K_U = 2.47$, $T_u = 10.6 \text{ sec}$).

| Process | $K_c = 1$ | $K_c = 0.5$ | $K_c = 2$ |
|---|---|---|---|
| $G_p(s) = \dfrac{2e^{-3s}}{10s+1}$ | $K_u = 2.90$ | $K_u = 2.61$ | $K_u = 2.90$ |
|  | $T_u = 10.8 \text{ sec}$ | $T_u = 10.8 \text{ sec}$ | $T_u = 10.7 \text{ sec}$ |

Fig. 11b

Identification results from Setpoint relay for process $G_p(s) = 2e^{-3s}/(10s+1)$. The ultimate gain and ultimate period from relay feedback are: $K_u = 2.46$ and $T_u = 10.6$ sec. The existing controller is of PI type: $G_c(s) = K_c(1+1/T_is)$; $r$(sec) is the estimate of deadtime from Model (4), and $r''$(sec) is that from Model (11); $r' = \sqrt{\tau\tau''}$; $\phi$ (degree) is the phase lag due to controllers, and $\omega_0$ (rad/sec) is the oscillation frequency.

| Existing Controller: | $K_u$ and $T_U$ | $T_p$ and $r'$ | $r'$ and $r''$ | $\phi$ and $\omega_0$ |
|---|---|---|---|---|
| $K_c = 1.5$ (aggressive) | $K_u = 2.69$ | $T_p = 5.04$ | $r = 2.53$ | $\phi = -23.56$ |
| $T_i = 5$ (aggressive) | $T_u = 11.8$ | $r' = 2.94$ | $r'' = 3.42$ | $\omega_0 = 0.458$ |
| $K_c = 0.5$ (sluggish) | $K_u = 2.34$ | $T_p = 4.48$ | $r = 2.64$ | $\phi = -10.78$ |
| $T_i = 10$ (sluggish) | $T_u = 12.0$ | $r' = 3.00$ | $r'' = 3.41$ | $\omega_0 = 0.523$ |
| $K_c = 2$ (aggressive) | $K_u = 2.68$ | $T_p = 5.01$ | $r = 2.69$ | $\phi = -5.14$ |
| $T_i = 20$ (sluggish) | $T_u = 11.7$ | $r' = 2.95$ | $r'' = 3.20$ | $\omega_0 = 0.551$ |
| $K_c = 0.2$ (sluggish) | $K_u = 2.90$ | $T_p = 5.10$ | $r = 1.83$ | $\phi = -61.61$ |
| $T_i = 2$ (aggressive) | $T_u = 11.0$ | $r' = 2.75$ | $r'' = 4.16$ | $\omega_0 = 0.270$ |

Fig. 12

Identification results from Setpoint relay for process $G_p(s) = 2e^{-3s}/(15s+1)$.
The ultimate gain and ultimate period from relay feedback are: $K_u = 3.52$ and
$T_u = 11.0$ sec. The existing controller is of PI type: $G_c(s) = K_c(1+1/T_i s)$;
$r$(sec) is the estimate of deadtime from Model (4), and $r''$(sec) is that from
Model (11); $r' = \sqrt{\tau\tau''}$; $\phi$ (degree) is the phase lag due to controllers,
and $\omega_0$ (rad/sec) is the oscillation frequency.

| Existing Controller: | $K_u$ and $T_U$ | $T_p$ and $r'$ | $r$ and $r''$ | $\phi$ and $\omega_0$ |
|---|---|---|---|---|
| $K_c = 1.5$ (aggressive) | $K_u = 3.85$ | $T_p = 7.35$ | $r = 2.66$ | $\phi = -25.01$ |
| $T_i = 5$ (aggressive) | $T_u = 12.0$ | $r' = 3.00$ | $r'' = 3.38$ | $\omega_0 = 0.427$ |
| $K_c = 0.5$ (sluggish) | $K_u = 3.37$ | $T_p = 6.52$ | $r = 2.75$ | $\phi = -11.34$ |
| $T_i = 10$ (sluggish) | $T_u = 12.1$ | $r' = 3.04$ | $r'' = 3.35$ | $\omega_0 = 0.498$ |
| $K_c = 2$ (aggressive) | $K_u = 3.77$ | $T_p = 7.21$ | $r = 2.78$ | $\phi = -5.31$ |
| $T_i = 20$ (sluggish) | $T_u = 12.0$ | $r' = 3.01$ | $r'' = 3.25$ | $\omega_0 = 0.532$ |
| $K_c = 0.2$ (sluggish) | $K_u = 3.52$ | $T_p = 6.81$ | $r = 1.90$ | $\phi = -67.45$ |
| $T_i = 2$ (aggressive) | $T_u = 12.2$ | $r' = 3.04$ | $r'' = 4.86$ | $\omega_0 = 0.207$ |

Fig. 13

Identification results from Setpoint relay for process $G_p(s) = 2e^{-5s}/(10s+1)$. The ultimate gain and ultimate period from relay feedback are: $K_u = 1.62$ and $T_u = 16.3$ sec. The existing controller is of PI type: $G_c(s) = K_c(1+1/T_i s)$; $r$(sec) is the estimate of deadtime from Model (4), and $r''$(sec) is that from Model (11); $r' = \sqrt{\tau\tau''}$; $\phi$ (degree) is the phase lag due to controllers, and $\omega_0$ (rad/sec) is the oscillation frequency.

| Existing Controller: | $K_u$ and $T_U$ | $T_p$ and $r'$ | $r$ and $r''$ | $\phi$ and $\omega_0$ |
|---|---|---|---|---|
| $K_c = 1.5$ (aggressive) | N/A | | | |
| $T_i = 5$ (aggressive) | (unstable) | | | |
| $K_c = 0.5$ (sluggish) | $K_u = 1.54$ | $T_p = 4.80$ | $r = 4.02$ | $\phi = -17.62$ |
| $T_i = 10$ (sluggish) | $T_u = 19.5$ | $r' = 4.87$ | $r'' = 5.89$ | $\omega_0 = 0.314$ |
| $K_c = 2$ (aggressive) | N/A | | | |
| $T_i = 20$ (sluggish) | (unstable) | | | |
| $K_c = 0.2$ (sluggish) | $K_u = 1.96$ | $T_p = 5.21$ | $r = 1.93$ | $\phi = -71.28$ |
| $T_i = 2$ (aggressive) | $T_u = 14.37$ | $r' = 3.85$ | $r'' = 7.69$ | $\omega_0 = 0.170$ |

Fig. 14

Identification results from Setpoint relay for process $G_p(s) = 2e^{-3s}/((10s+1)(7s+1))$. The ultimate gain and ultimate period from relay feedback are: $K_u = 2.99$ and $T_u = 22.8$ sec. The existing controller is of PI type: $G_c(s) = K_c(1+1/T_i s)$; $r$(sec) is the estimate of deadtime from Model (4), and $r''$(sec) is that from Model (11); $r' = \sqrt{\tau \tau''}$; $\phi$ (degree) is the phase lag due to controllers, and $\omega_0$ (rad/sec) is the oscillation frequency.

| Existing Controller: | $K_u$ and $T_U$ | $T_p$ and $r'$ | $r$ and $r''$ | $\phi$ and $\omega_0$ |
|---|---|---|---|---|
| $K_c = 1.5$ (aggressive) | N/A | | | |
| $T_i = 5$ (aggressive) | (unstable) | | | |
| $K_c = 0.5$ (sluggish) | $K_u = 2.18$ | $T_p = 9.30$ | $r = 5.56$ | $\phi = -26.68$ |
| $T_i = 10$ (sluggish) | $T_u = 26.8$ | $r' = 6.69$ | $r_2 = 8.06$ | $\omega_0 = 0.199$ |
| $K_c = 2$ (aggressive) | $K_u = 2.53$ | $T_p = 10.4$ | $r = 5.71$ | $\phi = -11.77$ |
| $T_i = 20$ (sluggish) | $T_u = 25.8$ | $r' = 6.46$ | $r'' = 7.30$ | $\omega_0 = 0.239$ |
| $K_c = 0.2$ (sluggish) | N/A | | | |
| $T_i = 2$ (aggressive) | (unstable) | | | |

Fig. 15

SYSTEM AND METHOD FOR CLOSED LOOP AUTOTUNING OF PID CONTROLLERS

PRIORITY DATA

This application claims benefit of priority of U.S. Provisional Application, Ser. No. 60/068,282, entitled "A New Approach to Closed Loop Autotuning for PID Controllers" filed Dec. 19, 1997.

FIELD OF THE INVENTION

The present invention relates to the automatic tuning of PID controllers, and in particular to a system and method for tuning a PID controller without removing the PID controller from the control loop in which it is originally embedded.

DESCRIPTION OF THE RELATED ART

Despite the development of more advanced control strategies, the majority of industrial control systems still use PID [Proportional-Integral-Derivative] controllers because they are standard industrial components, and their principle is well understood by engineers. Moreover, due to process uncertainties, a more sophisticated control scheme is not necessarily more efficient than a well-tuned PID controller. However, many controllers are poorly tuned, some too aggressively, and some too sluggishly. When the uncertainty in the disturbance or process dynamic characteristics is large, the tuning of a PID controller is often difficult, and the need for auto-tuning arises.

The most significant development for PID controller tuning can be dated back to the early work of Ziegler and Nichols (1942). Rather recently, many techniques have been proposed for the autotuning of PID controllers, such as relay feedback, pattern recognition techniques, and correlation techniques. For information on relay feedback, please see Astrom K. J. and T. Hagglund (1984), Automatic Tuning of Simple Regulators, Proceedings of IFAC $9^{th}$ World Congress, Budapest, pp. 1867–1872. For more information on pattern recognition techniques for PID autotuning, please see Shinskey F. G. (1994), Feedback Controllers for the Process Industries, McGraw-Hill Inc., New York. For more information on correlation techniques for PID autotuning, please see Hang C. C., T. H. Lee and W. K. Ho (1993), Adaptive Control, Instrument Society of America, North Carolina.

A comprehensive survey of autotuning techniques and industrial products is provided in Astrom K. J., T. Hagglund, C. C. Hang and W. H. Ho (1993), Automatic Tuning and Adaptation for PID Controllers—A Survey, Control Engineering Practice, Vol. 1, pp. 669–714. The most recent approaches include the non-symmetrical optimum method and the online identification procedure based on the Laguerre series. The non-symmetrical optimum method is discussed in Loron L. (1997), Tuning of PID Controllers by the Non-Symmetrical Optimum Method, Automatica, Vol. 33, No. 1, pp. 103–107. The online identification procedure is discussed in Park H. I., S. W. Sung, I. Lee and J. Lee (1997), On-line Process Identification Using the Laguerre Series for Automatic Tuning of the Proportional-Integral-Derivative Controller, Ind. Eng. Chem. Res., Vol. 36, pp. 101–111. However, the most popular autotuning approach in industry and academic research is perhaps relay based autotuning, which switches off the existing controller and uses a relay to excite the process.

FIG. 1A illustrates the structure of a PID control loop which is well known in the prior art. The PID control loop includes a PID controller and a process which is to be controlled. A process variable PV associated with the process is measured and compared to a set point value SP. An error value, defined as the difference of the set point and the process value, is supplied as the input to the PID controller. The output of the PID controller drives the process.

FIG. 1B illustrates a typical structure for relay feedback based autotuning of a PID controller. In relay feedback auto-tuning, the PID controller which is to be tuned is substituted with a relay. In FIG. 1B, this is illustrated by means of a switch which is coupled to provide the error signal e to the relay instead of to the PID controller. The output of the relay drives the process instead of the PID controller. The non-linear characteristic of the relay induces a limit cycle oscillation in the process variable PV. By measuring the amplitude and frequency of the limit cycle oscillation, a new set of PID controller parameters may be calculated according to fundamental equations which characterize the new feedback loop (i.e. with the relay substituted). For more information concerning relay based autotuning, please refer to Hagglund et al., U.S. Pat. No. 4,549,123, which is hereby incorporated by reference. After the new PID parameters have been calculated, the PID controller is updated with these new parameters and the PID controller is switched back into the control loop while the relay is removed.

Thus, during the autotuning experiment, the PID controller, which would normally provide for the stability of the process, is temporarily substituted with a relay, which can be viewed as a crude controller. Thus, the output values of the relay must be carefully chosen to guarantee the stability of the limit cycle oscillation. This in turn requires the system operator to have specialized knowledge of the acceptable range of input values for the process.

Another popular scheme of PID autotuning has been proposed by Schei T. S. (1992), A Method for Closed Loop Automatic Tuning of PID Controllers, Automatica, Vol. 28, No,. 3, pp. 587–591, which is hereby incorporated by reference. The method of Schei is illustrated in FIG. 2. An existing control loop, shown inside the dotted lines, includes a process and a PID controller. The PID controller comprises the two blocks denoted by the transfer functions $C_r(s)$ and $C_y(s)/C_r(s)$. In order to tune the PID controller, the additional structures shown outside the dotted lines are added. Namely, an input signal $y_0$ and the process variable are subtracted, and the difference is supplied to a linear dynamic element d(s) and a relay coupled in series. The output of the relay is added to the input signal $y_0$, and this sum is provided to as the reference input $y_r$ to the existing control loop. Again, a limit cycle oscillation is induced in the process variable PV, and the PID controller parameters are iteratively adjusted until the transfer function of the control loop from reference signal $y_r$ to process variable PV attains a predetermined amplitude condition.

Although Schei's method allows the PID controller to remain intact within the existing control system, an obvious shortcoming to the method is that the time required for the PID controller parameters to iteratively converge in the online experiment may be too long to be acceptable in practice. Furthermore, Schei's method uses a linear element d(s) to influence the frequency of the limit cycle oscillation, and the performance of the method is acceptable only when the tuning modes are reasonably chosen. Thus, the operator must have considerable knowledge about the process.

Thus, it is apparent that in the field of PID autotuning, a need exists for a method which will allow the PID controller to remain intact within an existing control loop, and provide for a more time efficient means of determining a new set of PID controller parameters.

SUMMARY OF THE INVENTION

The present invention comprises a system and method for tuning a PID controller without removing the PID controller from an ambient PID control loop. The PID control loop includes the PID controller and a process under control. The input of the PID control loop is compared to a process variable supplied by the process. The result of the comparison is supplied to the PID controller, and the PID controller drives the process.

According to the present invention, during autotuning a relay is applied to the input of the PID control loop. In other words, the relay output is coupled to the input of the PID control loop. The relay operates to compare a set point value to the process variable. If the set point value is greater than the process variable, the relay drives the loop input with a first relay value. However, if the set point value is less than the process variable, the relay drives the loop input with a second relay value. In response to the application of the relay, the PID control loop develops a sustained oscillation in the process variable.

Once the sustained oscillation has developed, the period and amplitude of the oscillation are measured, and these values are used to calculate new PID controller parameters. In particular, the period and amplitude of oscillation are used to calculate a time constant and dead time parameter associated with a standard model of the process. The time constant and dead time are used to calculate the new PID controller parameters according to the formulae associated with the Ziegler-Nichols reaction curve method. Alternately, the time constant and dead time parameter may be used to calculate the ultimate period and ultimate gain, and then the Ziegler-Nichols method based on these later parameters may be used to calculated the new PID controller parameters. After the new PID controller parameters have been calculated, the relay is removed from the loop input, the set point value is supplied to the loop input, and the PID controller is configured with the new parameters.

In the preferred embodiment of the invention, a computer is employed to perform at least some of the calculations associated with the autotuning method discussed above. In this embodiment, the computer is supplied with samples of the process variable through data acquisition logic such as an A/D converter. Under software control, the computer accepts user input to perform autotuning of the PID controller. In response to this user input, the computer performs the operations associated with applying the set point relay, detecting the sustained oscillation, measuring the oscillation period and amplitude, and calculating the new PID controller parameters.

In the case where the PID controller is a physical device, the present invention advantageously allows a system operator to avoid the necessity of physically removing the PID controller in order to perform PID controller tuning. Since the parameter calculation algorithms employed in the present invention avoids online iteration, these parameters may be calculated more quickly than in the method advanced by Schei.

BRIEF DESCRIPTION OF THE DRAWINGS

A better understanding of the present invention can be obtained when the following detailed description is considered in conjunction with the following drawings, in which:

FIGS. 11a and 11b (collectively referred to as FIG. 11) illustrate a comparison of estimated ultimate gain and ultimate period when the existing controller is proportional-only; and FIGS. 12–15 present identification results from the setpoint relay experiment for a variety of realization for the process transfer function.

Figure 1A:
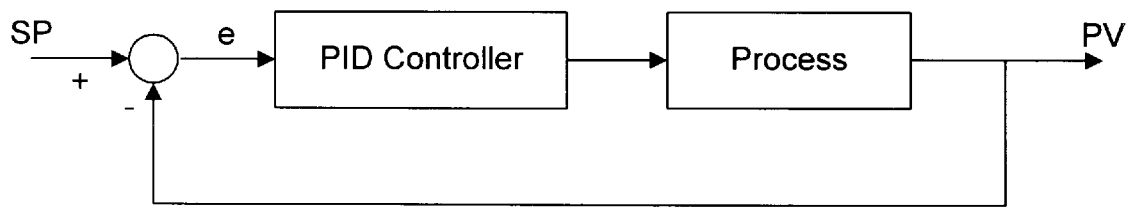
FIG. 1A illustrates the structure of a PID control loop which is well known in the prior art.

While the invention is susceptible to various modifications and alternative forms, specific embodiments are shown by way of example in the drawings and will herein be described in detail. It should be understood however, that drawings and detailed descriptions thereto are not intended to limit the invention to the particular forms disclosed. But on the contrary the invention is to cover all modifications, equivalents and alternatives following within the spirit and scope of the present invention as defined by the appended claims.

DETAILED DESCRIPTION OF THE PREFERRED EMBODIMENT

Figure 3:
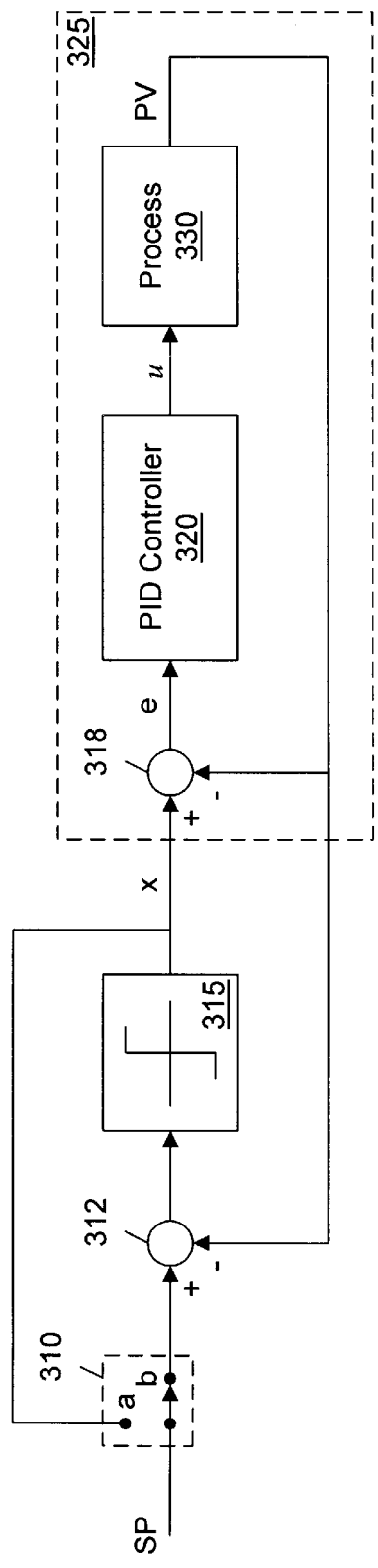
FIG. 3 is a block diagram of the method for PID autotuning according to the present invention.

The problems associated with the prior art PID autotuning methods discussed above are largely solved by the method of the present invention illustrated in FIG. 3. In the present invention, an existing PID control loop 325 shown in the dotted lines is augmented with a setpoint relay 315. In particular, relay 315 is supplied with the difference of a setpoint SP and the process variable PV, and the output of the relay is supplied as the input x of the existing control loop 325.

It is assumed that a stable control loop 325, although perhaps poorly tuned, has been established prior to the autotuning experiment. In other words, the control loop 325 is preferably initially tuned prior to the application of the setpoint relay. In this initial tuning phase, switch 310 is configured to bypass relay 315, and couples the setpoint SP directly to the input x of the control loop 325.

In the autotuning phase, switch 310 is configured to couple the setpoint SP to the plus input of a subtraction unit 312. The minus input of the subtraction unit 312 is supplied with the process variable PV. The difference output of the subtraction unit 312 is supplied to relay 315, and relay 315 is coupled to the input x of the control loop 325. Thus, the setpoint relay 315 is configured to receive the difference of the setpoint SP and the process variable PV in feedback fashion. In response to the setpoint relay 315 driving the input x to the control loop 325, a limit cycle oscillation is induced in the process variable PV. It is noted that since the PID controller 320 remains intact within the control loop 325 during the autotuning phase, a stable limit cycle oscillation of the process variable PV is more easily achieved than in the relay feedback based autotuning method of FIG. 1B.

Figure 4A:
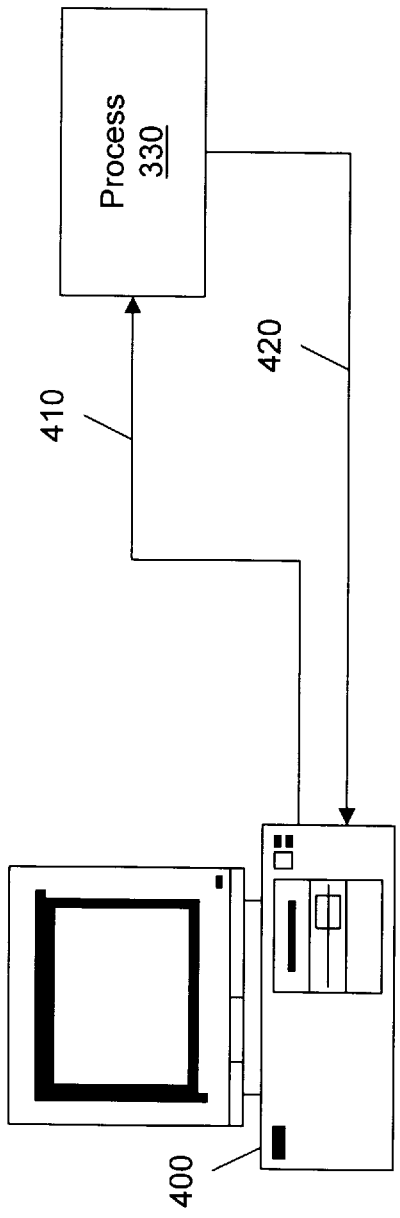
FIG. 4A illustrates a first embodiment of the system of the present invention which includes a computer 400, and process 330 (from FIG. 3)

FIG. 4A illustrates a first embodiment of the system of the present invention which includes a computer 400, and process 330 (from FIG. 3). Computer 400 supplies actuating signals to the process 330 through actuating bus 410. Actuating bus 410 corresponds to the actuating signal u of FIG. 3. It is noted that a D/A conversion device (not shown) is preferably included in the first embodiment to convert the actuating signal from a digital form to an analog form. Furthermore, computer 400 senses the process variable PV through measurement bus 420. Data acquisition logic (not shown) such as an A/D conversion device is preferably employed to convert the process variable from analog to digital form. Thus, computer 400 operates on a stream of samples of the process variable PV. In this first embodiment of the present invention, computer 400 performs operations associated with FIG. 3. Namely, software running on computer 400 provides the system user with an option for choosing between normal operational mode or autotuning mode. In response to the system user choosing normal operational mode, computer 400 implements the processing operations of FIG. 3 which correspond to switch 310 in position a. In response to the system user choosing autotuning mode, computer 400 implements the processing operations of FIG. 3 which correspond to switch 310 in position b.

Figure 4B:
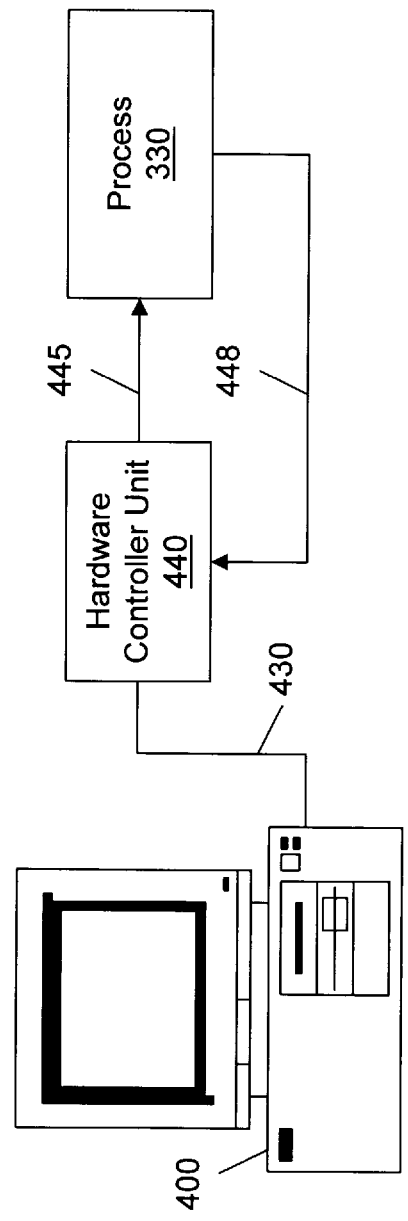
FIG. 4B illustrates a second embodiment of the system of the present invention which includes computer 400, process 330, and external hardware controller unit 440.

FIG. 4B illustrates a second embodiment of the system of the present invention which includes computer 400, process 330, and external hardware controller unit 440. Computer 400 is coupled to hardware controller unit 440 through a signal bus 420. Hardware controller unit 440 drives process 330 with actuating signal u through process bus 445. Also, hardware controller unit 440 senses process variable PV through sensing bus 448. Hardware controller 440 preferably includes an A/D conversion device to convert the process variable received via sensing bus 448 from analog to digital form.

In this second embodiment of the present invention, computer 400 sends the setpoint signal SP to the hardware controller unit 440 through signal bus 430. Hardware controller unit 440 performs at least a portion of the operations associated with FIG. 3 such as the relay operation 315, the PID Operation 320, the subtraction operation 318, and the subtraction operation 312.

Software running on computer 400 provides a system user with an option for choosing between normal operation mode or autotuning mode. In response to the system user choosing normal operational mode, computer 400 sends an indication of this choice to the hardware controller unit 440 through signal bus 430. In response to receiving this indication of normal operational mode, hardware controller unit 440 performs the processing operations associated with FIG. 3 which correspond to switch 310 in position a. In response to the system user choosing autotuning mode, computer 400 sends an indication of this choice to the hardware controller unit 440 through signal bus 430. In response to receiving the indication of autotuning mode, the hardware controller unit 440 performs the processing operations associated with FIG. 3 which correspond to switch 310 in position b.

In an alternate embodiment of FIG. 4B, hardware controller unit 440 performs the processing operations associated with control loop 325, and computer 400 sends an actuating signal which correspond to input x (of FIG. 3) through signal bus 430. In this alternate embodiment, computer 400 performs the processing operations associated with switch 310, subtraction unit 312, and relay 315.

Figure 5:
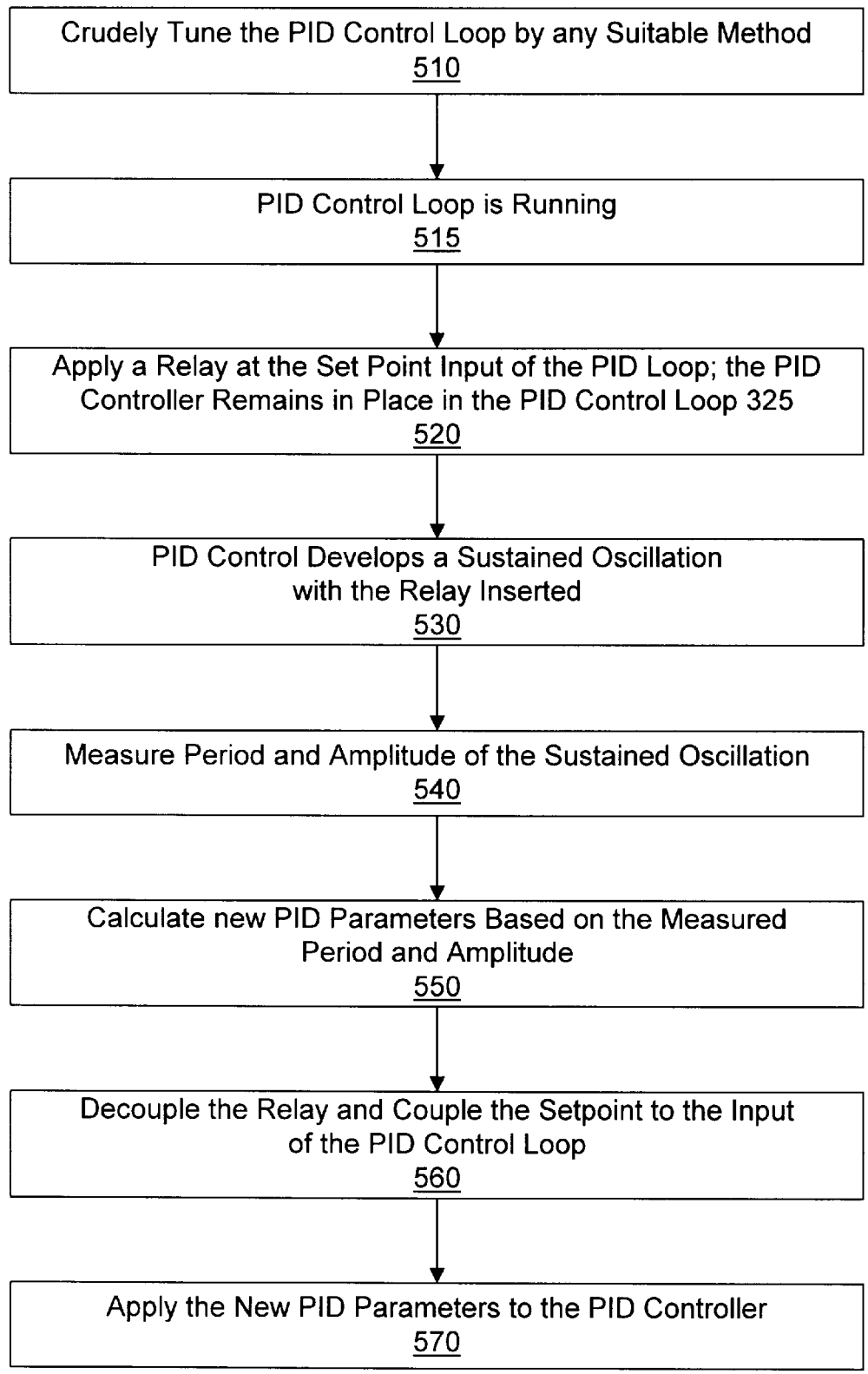
FIG. 5 is a flowchart of PID autotuning according to the preferred embodiment of the present invention.

FIG. 5 is a flowchart of the PID autotuning method of the preferred embodiment of the present invention. The method assumes that a fairly stable control loop 325 has been established prior to autotuning, i.e., that PID controller 320 has been at least crudely tuned by any suitable method as shown in step 510. In step 515, the PID control loop 325 is runs with the crudely tuned controller parameters until a steady state response is achieved. Although step 515 is included in the preferred embodiment of the invention, it is noted that step 515 is optional.

In step 520, a relay 315 is applied to the input of the PID control loop 325, i.e. the output of the relay drives the input of the PID control loop 325. The relay 315 operates to compare the setpoint SP with the process variable PV. If the setpoint SP is greater than the process variable PV, then the relay output attains a first output value $d_1$. If the setpoint SP is smaller than the process variable PV, then the relay output attains a second output value $d_2$. In the preferred embodiment of the invention, the first and second output values $d_1$ and $d_2$ take the values which are symmetric with respect to the setpoint value SP. Since the relay 315 drives the input of the control loop 325, the relay amplitude d has the same units as the controlled process variable PV. It is noted that the PID controller 320 remains in place within the PID control loop 325 during the autotuning experiment.

In response to the application of the relay 315, the process variable PV develops a sustained oscillation as shown in step 530. In step 540, the period $T_0$ and amplitude a of the sustained oscillation are measured. Computer 400 (or alternately hardware controller unit 440) performs these measurements based on the sampled values of the process variable.

In step 550, computer 400 (or hardware controller unit 440) calculates a new set of PID controller parameters based on the measured oscillation period and amplitude. The preferred method for calculating the new PID parameters may be summarized as follows. First, the oscillation amplitude a is used to calculate an equivalent gain $K_R$ for the relay 315 [see equation (1) or (2) below]. Next, the equivalent gain $K_R$ and oscillation frequency $$\omega_0 = 2\pi / T_0$$

are used to calculate a pair of modeling parameters for the process. Namely, the process is modeled as a series combination of a gain, a time delay, and a pure integrator. Thus, the transfer function of the process is given by $$G_P(s) = \frac{e^{-\tau s}}{T_P s},$$

where $T_P$ is the time constant, and $\tau$ is the deadtime. The equivalent gain $K_R$ and oscillation frequency $\omega_0$ are used to calculate the time constant $T_P$ and deadtime $\tau$ [see equations (8) and (9) below]. Having calculated the time constant and deadtime of the process model, the new PID parameters may be calculated directly from the Ziegler-Nichols reaction curve formulae. Alternately, the Ziegler-Nichols method based on ultimate gain and ultimate period may be used to calculate the new PID parameters, in which case the ultimate gain and ultimate frequency may be calculated directly from the time constant and deadtime [see equations (15) and (16)].

In step 560, the input to the PID control loop 325 is decoupled from the relay 315 and coupled to the setpoint SP. In step 570, the newly calculated PID parameters are applied to the PID controller 320.

Derivation of the Autotuning Equations According to the Present Invention

Figure 6A:
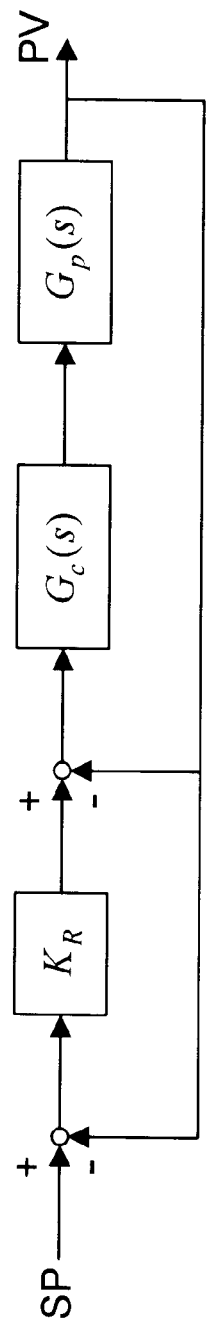
FIG. 6A is a block diagram of the present invention during autotuning mode.
Figure 6B:
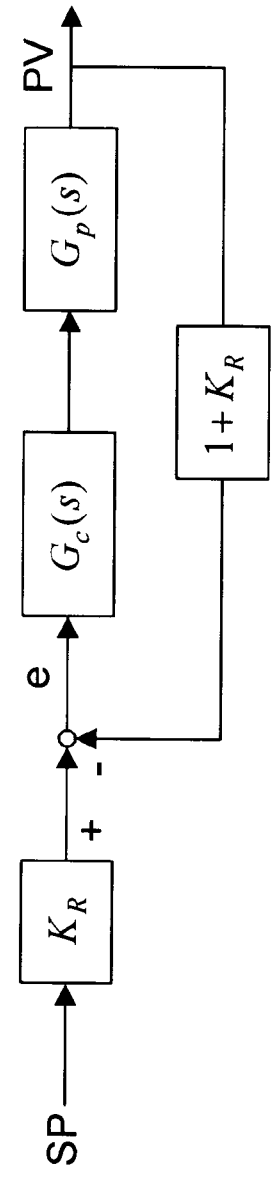
FIG. 6B illustrates a rearrangement of the block diagram of FIG. 6B according to the present invention.

Assume the relay 315 may be modeled as a multiplicative gain $K_R$. Let $G_C(s)$ denote the transfer function of the PID controller, and $G_P(s)$ the transfer function of the process. FIG. 6A is a block diagram of the present invention during autotuning mode. Observe that the error e can be calculated as:

$$e = K_R SP - PV - K_R PV$$

$$= K_R SP - (1+K_R)PV \quad (1)$$

where SP is the setpoint; PV is the controlled variable or process variable. Thus, the block diagram of FIG. 6A can be rearranged as shown in FIG. 6B. The loop transfer function for the block diagram of FIG. 6B is $(1+K_R)G_P(s)G_C(s)$.

Autotuning of the Present Invention Under Proportion-Only Control

The equivalent gain or describing function for the relay element is (Astrom and Hagglund, 1984):

$$K_R = \frac{4d}{\pi a} \quad (1)$$

where a is the amplitude of the sustained oscillation of the process output and d is the amplitude of relay. When hysteresis is used, the equivalent gain will be (Astrom and Wittenmark, 1995; Astrom and Hagglund, 1984; Hang et al., 1993):

$$K_R = \frac{4d}{\pi \sqrt{a^2 - \varepsilon^2}} \quad (2)$$

where $\varepsilon$ is the hysteresis width.

If the existing controller is proportional-only with a gain of $K_C$, the ultimate gain of the process can be derived as follows from the loop transfer function:

$$K_u = K_C(1+K_R) \quad (3)$$

With the proportional-only controller, there is no phase shift due to the controller. Therefore, the oscillatory frequency can be equated to the ultimate frequency. Since a proportional-only controller will produce offset in the steady state, they are used occasionally in some non-critical loops such as level loops and pressure loops.

In practice, more than 90 percent industrial control loops are under PI/D control. In the following subsection, the autotuning method of the present invention under PI/D control is discussed. In this case, the determination of ultimate gain and ultimate period is slightly more sophisticated than the proportional-only case and some simplification methods are used.

Autotuning of the Present Invention Under PI/D Control

Figure 1B:
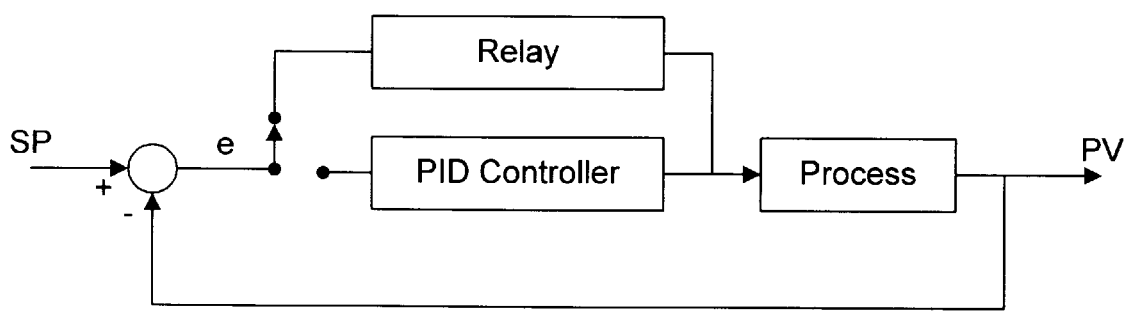
FIG. 1B illustrates a typical structure for relay feedback based autotuning of a PID controller.
Figure 2:
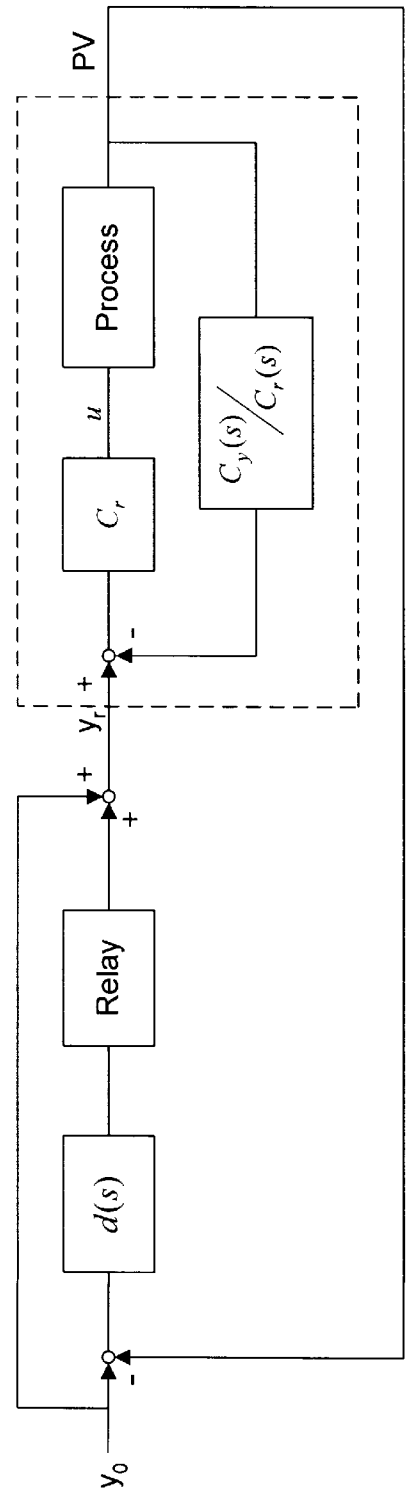
FIG. 2 is a block diagram illustrating the prior art method of Schei for autotuning a PID controller.

The relay based identification method of FIG. 1B can give only one critical point on the Nyquist curve of the open loop transfer function, which is able to determine two unknown parameters in the process model. To facilitate the identification procedure, the Applicants adopt Chien and Fuehauf's suggestion that many chemical processes can be modeled for the purpose of feedback tuning by a transfer function containing only a gain, a deadtime, and a pure integrator (Chien and Fruhauf, 1990; Luyben, 1996):

$$G_P(s) = \frac{e^{-\tau s}}{T_P s} \quad (4)$$

where $T_P$ is the time constant and $\tau$ is the deadtime.

This type of model is able to adequately represent the dynamics of many processes over the frequency range of interest for feedback controller design, i.e., near the ultimate frequency where the total open-loop Nyquist plot approaches the (-1,0) point. This simple model is very convenient for process identification because it contains only two parameters. Therefore, it was used to interpret the relay autotuning method by Astrom and Hagglund (1988).

It is noteworthy that Model (4) is an exact expression of the process used in the reaction curve method proposed by Ziegler and Nichols (1942). This method is based on a single experimental test that is made with the controller in the manual mode. A step change in the controller output is introduced and the measured process response is recorded, and the reaction curve is characterized by two parameters: the normalized slope of the tangent through the inflection point, which is exactly the reciprocal of $T_P$; and the time at which the tangent intersects the time axis, which is $\tau$, the deadtime in Model (4). Note that the slope-intercept characterization can be used for self-regulating and non-self-regulating processes. With the help of the setpoint relay based method of the present invention, the above identification procedure can be performed automatically in the closed loop to determine the parameters for reaction-curve based tuning.

Model (4) is an approximation of the more commonly used first order plus deadtime model:

$$G'_P(s) = \frac{K_P e^{-\tau' s}}{Ts + 1} \quad (5)$$

where $K_P$ is process gain, T is time constant and $\tau'$ is the deadtime. Consider a PID controller with the following transfer function, $$G_C(s) = K_C \left(1 + \frac{1}{T_i s}\right) \left(\frac{T_d s + 1}{\alpha T_d s + 1}\right),$$

where $T_i$ is the integral time, $T_d$ is the derivative time, $\alpha$ is the derivative gain factor. When sustained oscillation is developed, we have:

$$\arg[(1 + K_R)G_P(j\omega_0)G_C(j\omega_0)] = \qquad (6)$$
$$\arg\left((1 + K_R)\frac{e^{-\tau s}}{T_P s}\frac{K_C(T_i s + 1)}{T_i s}\left(\frac{T_d s + 1}{\alpha T_d s + 1}\right)\right)\bigg|_{s=j\omega_0} = -\pi$$

and $$|(1 + K_R)G_P(j\omega_0)G_C(j\omega_0)| = \qquad (7)$$
$$\left|(1 + K_R)\frac{e^{-\tau s}}{T_P s}\frac{K_C(T_i s + 1)}{T_i s}\left(\frac{T_d s + 1}{\alpha T_d s + 1}\right)\right|_{s=j\omega_0} = 1$$

where $\omega_0$ is the oscillation frequency. From Eq.(6) we obtain that $$\tau = \frac{\tan^{-1}(T_i \omega_0) + \tan^{-1}(T_d \omega_0) - \tan^{-1}(\alpha T_d \omega_0)}{\omega_0}. \qquad (8)$$

From Eq.(7) we obtain:

$$T_P = \frac{(1 + K_R)K_C\sqrt{T_i^2 \omega_0^2 + 1}\sqrt{T_d^2 \omega_0^2 + 1}}{T_i \omega_0^2 \sqrt{\alpha^2 T_d^2 \omega_0^2 + 1}}. \qquad (9)$$

In the same way, we obtain the estimate of deadtime in Model (5) as:

$$\tau' = \frac{\frac{\pi}{2} + \tan^{-1}(T_i \omega_0) - \tan^{-1}(T\omega_0) + \tan^{-1}(T_d \omega_0) - \tan^{-1}(\alpha T_d \omega_0)}{\omega_0}. \qquad (10)$$

It is noticeable that $\tau \leq \tau'$. Therefore, if the true process is of the form (5) but Model (4) is assumed, the estimated time delay tends to be smaller than the actual delay. Moreover, if the existing controller is a PI, a phase lag is introduced by the integral action. The oscillation frequency $\omega_0$ is normally lower than the ultimate frequency of the process. If the process time constant is very small, Model (4) will not be a good approximation of Model (5). A large error will occur in the estimation of deadtime, as the phase lag caused by the integral action will be exaggerated. Consequently, the estimate of deadtime will be much smaller than the real value.

A heuristic approach to alleviate this problem is to approximate Model (5) by $$G_P(s) = \frac{e^{-\tau'' s}}{T_P s + 1} \qquad (11)$$

The time delay in this model is calculated as:

$$\tau'' = \frac{\frac{\pi}{2} + \tan^{-1}(T_i \omega_0) - \tan^{-1}(T_P \omega_0) + \tan^{-1}(T_d \omega_0) - \tan^{-1}(\alpha T_d \omega_0)}{\omega_0}. \qquad (12)$$

Note that $$\tau'' - \tau' = \frac{\tan^{-1}(T\omega_0) - \tan^{-1}(T_P \omega_0)}{\omega_0}$$

and $$T_P \approx \frac{T}{K_P},$$

so if $K_P \geq 1$, $\tau \leq \tau' \leq \tau''$, ie., the value of $\tau'$ should be between $\tau$ and $\tau''$; but if $\omega_0$ is very small due to the phase shift, $\tau''$ will be much bigger than $\tau'$. A conservative measure is to geometrically average these two deadtimes, i.e., $\tau' = \sqrt{\tau \tau''}$. If $K_P \leq 1$, $\tau \leq \tau'' \leq \tau'$, the geometrical average still gives a good estimate since $\tau$ and $\tau''$ are close to each other in this case. This idea will be clarified by the simulation analysis in the following section.

Based on the estimates of deadtime and time constant, we can use the Ziegler-Nichols reaction curve formula to calculate the PI/D parameters directly. If we wish to use the tuning formula based on ultimate gain and ultimate period, these two parameters needed for autotuning can be calculated from:

$$\arg(G_C(j\omega_u)G_P(j\omega_u)) = \arg\left(K_u \frac{e^{-\tau s}}{T_P s}\right)\bigg|_{s=j\omega_u} = -\pi \text{ and} \qquad (13)$$

$$|G_C(j\omega_u)G_P(j\omega_u)| = \left|K_u \frac{e^{-\tau s}}{T_P s}\right|_{s=j\omega_u} = 1 \qquad (14)$$

where $\omega_u$ is the ultimate frequency. With $T_u = 2\pi/\omega_u$ we obtain:

$$T_u = 4\tau \qquad (15)$$

and the ultimate gain:

$$K_u = \frac{2\pi T_P}{T_u} \qquad (16)$$

Simulation Analysis of Identification Procedures

Hereafter the method of the present invention will be referred as the setpoint relay method. To verify the setpoint relay method, we carry out the setpoint relay experiments on a first order plus deadtime process and a second order plus deadtime process. In the former case, we also change the model parameters such as time constant, deadtime and process gain.

Simulations for Proportional-only Controller

If the existing controller is proportional-only, the setpoint signal SP in FIG. 6A needs to be the steady-state value of the process to assure the sustained oscillation. In this case, the steady-state value of the process value PV under proportional-only control is used as the SP signal for setpoint relay.

Figure 7A:
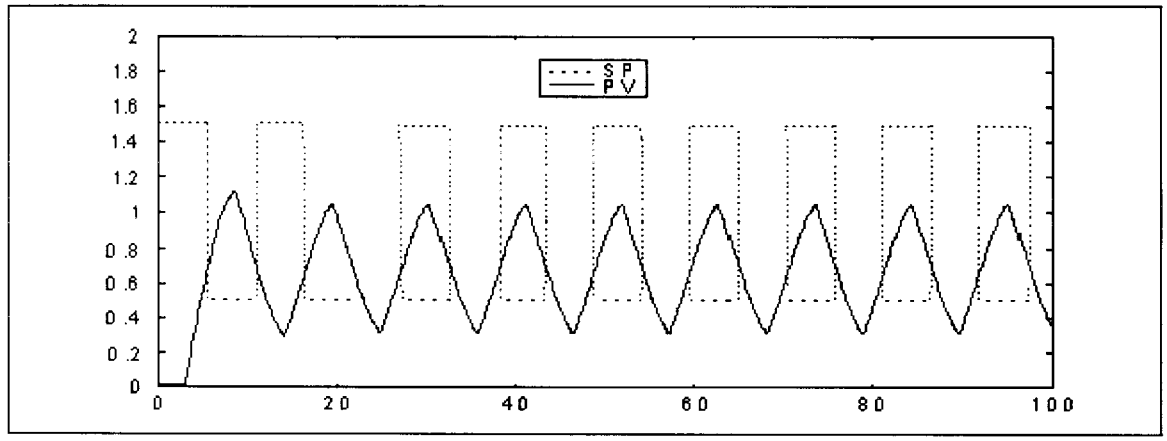
FIGS. 7a, 7b, and 7c (collectively referred to as FIG. 7) illustrate sustained oscillations associated respectively with (a) setpoint relay where the existing controller is proportional-only, (b) relay feedback, and (c) setpoint relay where the existing controller is of PI type.
Figure 7B:
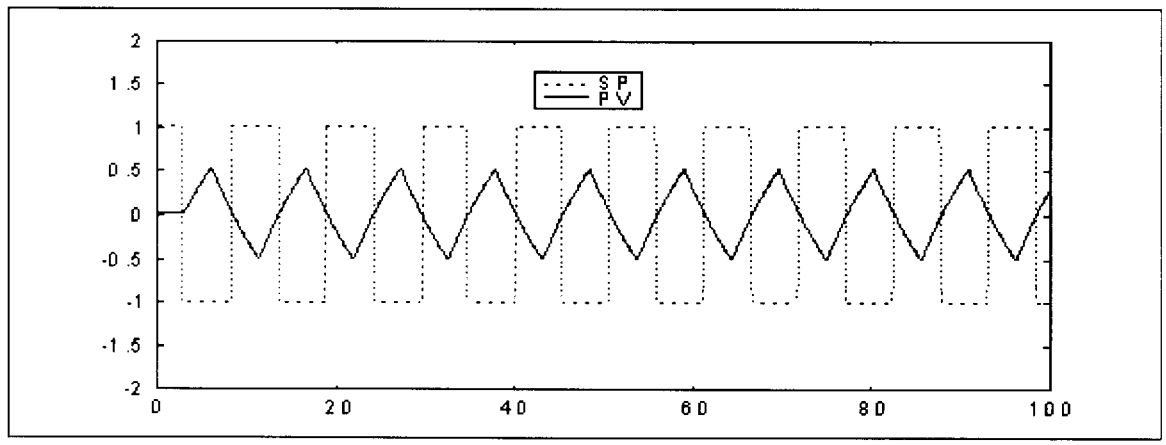

For process $$G_P(s) = \frac{2e^{-3s}}{10s + 1},$$

the setpoint relay experiment is shown in FIG. 7a, where the controller gain is 1. The sustained oscillation is very similar to that under relay feedback, as shown in FIG. 7b.

The comparisons of the estimated ultimate gain and ultimate period between setpoint relay and relay feedback are listed in FIG. 11, which indicates that results from setpoint relay are very close to those from relay feedback experiment; and they are not sensitive to the changes of the controller gain.

Simulation Analysis for PI/D Controller

Figure 7C:
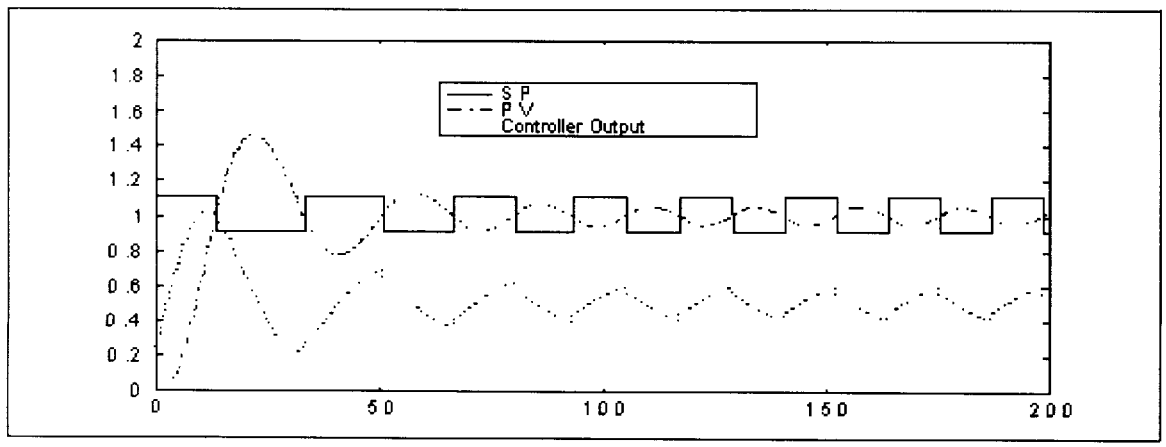
Figure 8A:
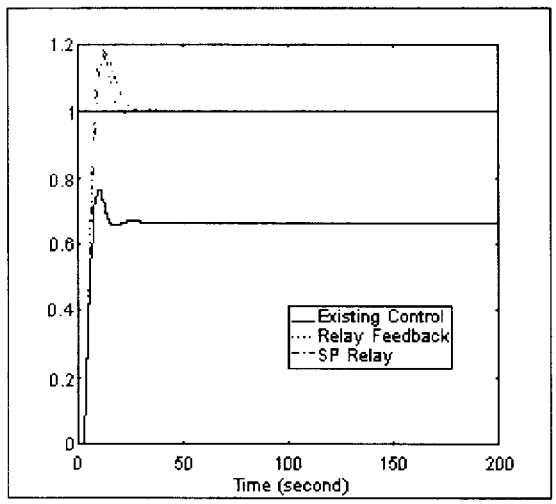
FIGS. 8a–8d (collectively referred to as FIG. 8) illustrate a comparison of step responses for various realizations of the process transfer function with unity proportional gain and infinite integral time.
Figure 8B:
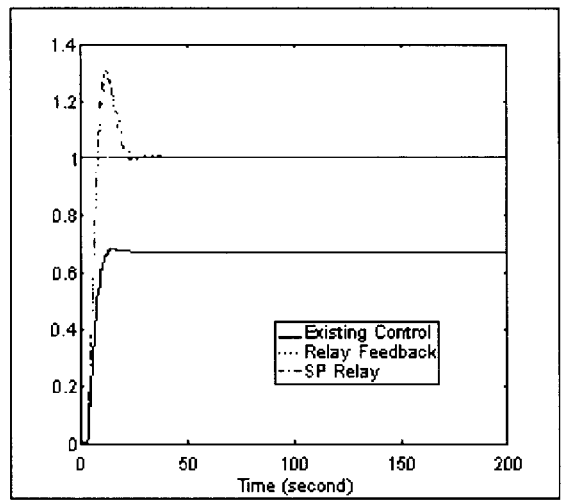
Figure 8C:
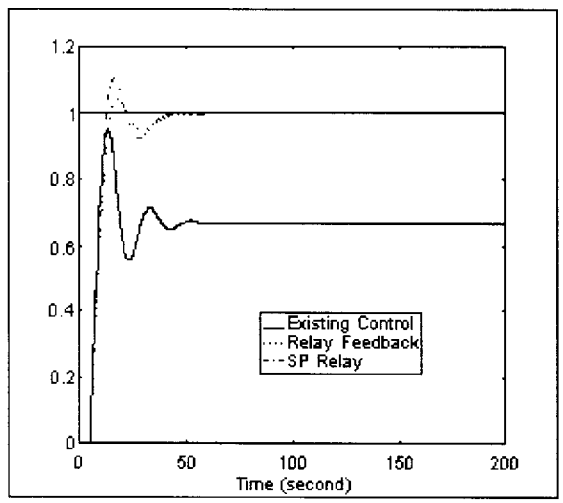
Figure 8D:
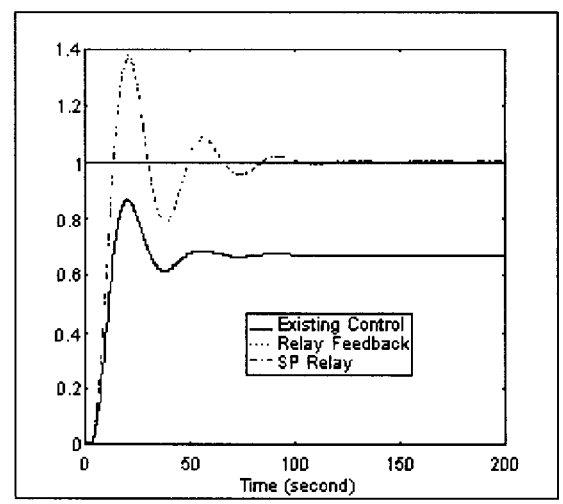
Figure 9A:
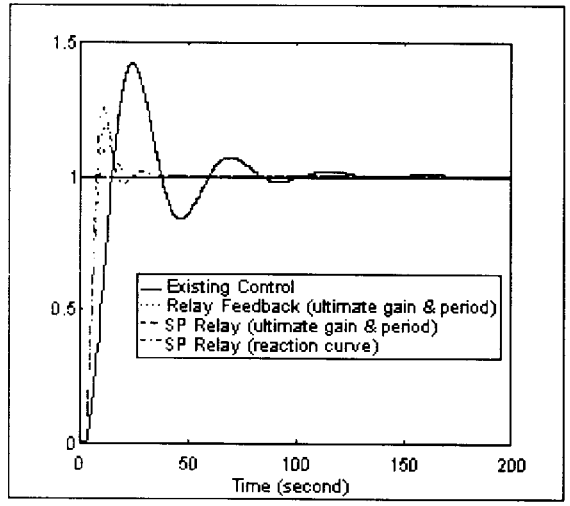
FIGS. 9a–9d (collectively referred to as FIG. 9) illustrate a comparison of step responses for various realizations of the process transfer function, proportional gain, integral time, and derivative time, and oscillation amplitude.
Figure 9B:
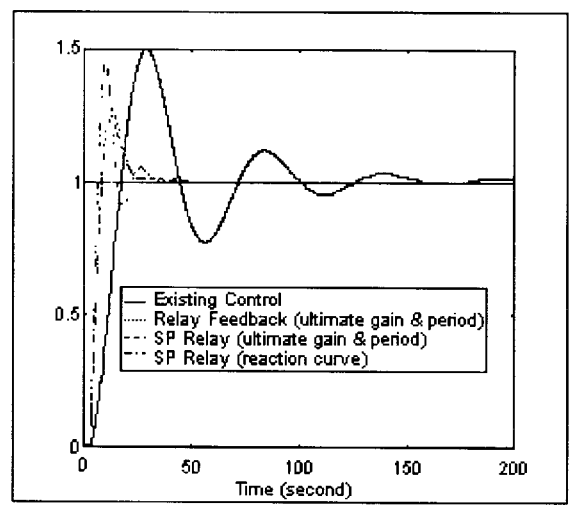
Figure 9C:
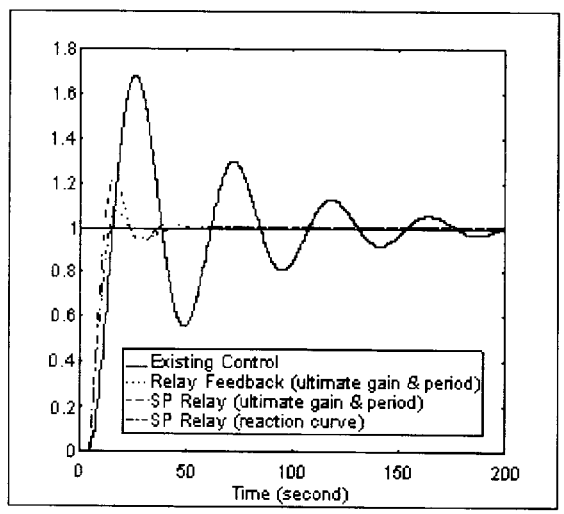
Figure 9D:
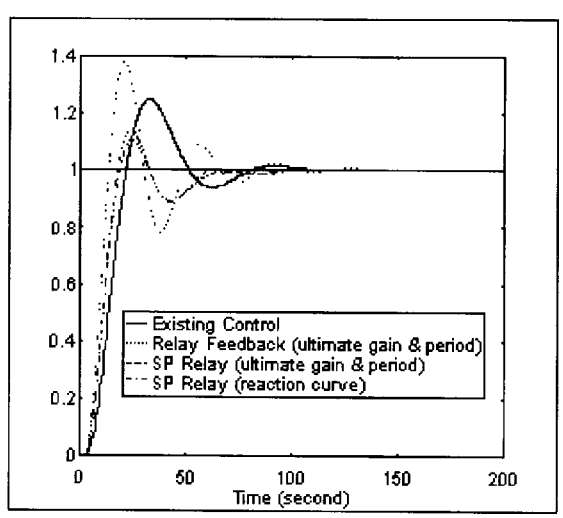

If the existing controller is of PI/D type, the SP signal for the relay in FIG. 6A is the same as the SP for the PI/D controller. However, the ultimate period will not be the same as the oscillation period any more, because the integral action causes extra phase shift between PV and the controller output. FIG. 7c depicts the experimental results for $G_P(s)=2e^{-3s}/(10s+1)$ and the existing controller setting is: $K_C=0.2$, $T_I=2$ (sec), its step response is shown in FIG. 9a.

Under these circumstances, the computational procedure discussed above is used to obtain the ultimate gain and ultimate period. The result is listed in FIG. 12. As can be seen from FIG. 12, when the phase lag is large due to the integral action in the controller, the oscillation frequency is much smaller from the ultimate frequency of the process under control. For example, in the last case, the oscillation frequency is 0.270 rad/sec, while the ultimate frequency is 2*3.14/10.6=0.593 rad/sec. Furthermore, the deadtime estimate from Model (4) (1.83 sec) is very inaccurate and misleading. However, after compensation via geometrically averaging $\tau_1$ and $\tau_2$, an accurate estimate is obtained and the identification results (ultimate gain and ultimate period) are very close to those from the relay feedback experiment.

In order to validate this approach further, extensive simulation analyses are performed and favorable outcomes are obtained. Several situations are shown in FIGS. 13–15 for the cases of $G_P(s)=2e^{-3s}/(15s+1)$, $2e^{-5s}/(10s+1)$, $2e^{-3s}/(10s+1)(7s+1)$. As long as the existing controller is stable, the proposed method always produces good estimates of process model parameters.

Control Design and Performance Comparison

Here we adopt Ziegler and Nichols' ultimate gain/period and reaction curve methods for determining the parameters of a PID controller. The controller tuning formulas can be found in, e.g., Seborg et al. (1989) and Smith and Corripio (1997). These parameters usually result in oscillatory responses. Modified tuning formulas are also available if more conservative tuning is desirable. Naturally, the method will not work for all systems. First, there may not be unique limit cycle oscillations for an arbitrary transfer function. Second, PID control is not appropriate for all processes. In short, all design methods furnish guidelines for settings only; field adjustment still may be necessary (Seborg et al., 1989).

FIGS. 8 and 9 are step response comparisons for the existing control, the relay feedback tuning, and the setpoint relay tuning, where the worst cases (the largest phase lag due to existing controllers) are used for illustration.

Figure 10:
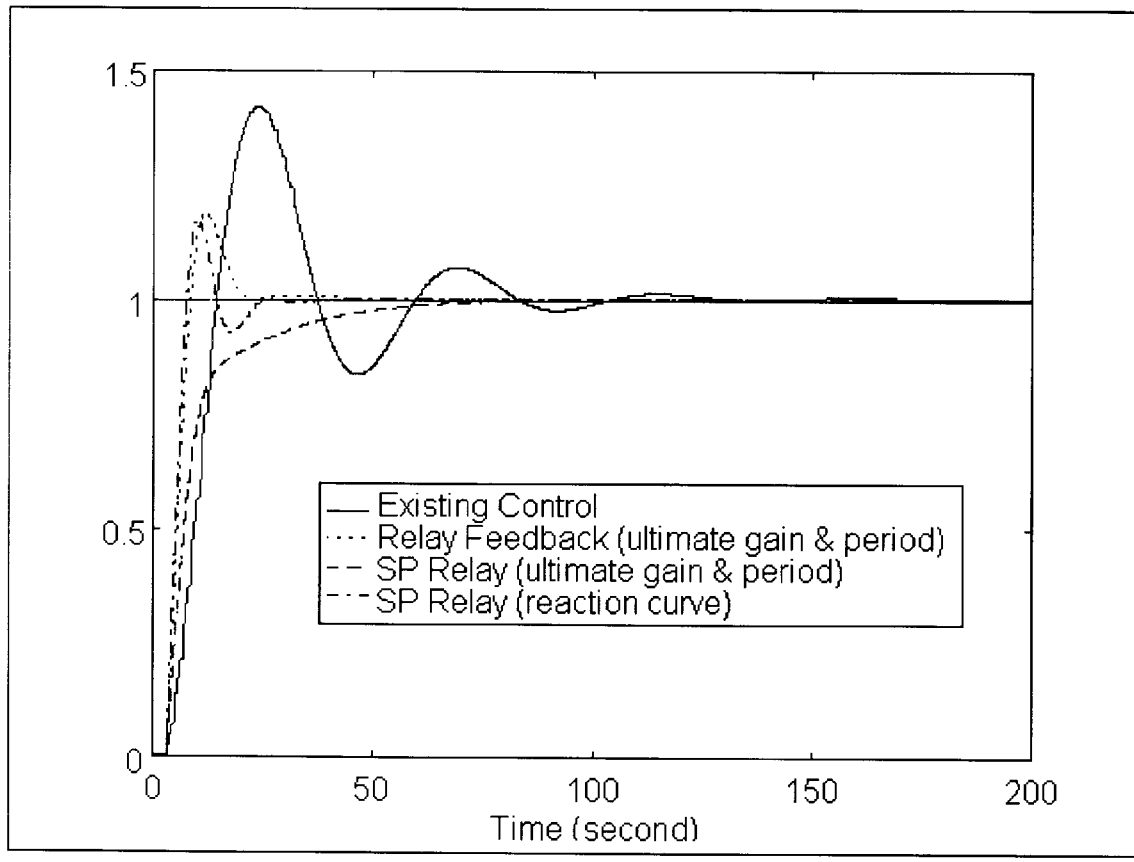
FIG. 10 illustrates a comparison of step responses between an existing controller, relay feedback, setpoint relay using ultimate gain/period, setpoint relay using reaction curve method, where the process transfer function is fixed.

Since we use Model (4) as an approximation of Model (5), it is sensible to check the autotuning performance when $K_P$ is far away from 1, and the simulation result shown is FIG. 10 indicates that, even when $K_P$ is much larger than 1, the performance is still satisfying, and in such case the reaction curve method is better than the ultimate gain and period method, where the ultimate gain and ultimate period obtained from relay feedback experiment are 0.025 and 10.6 (sec) respectively; those from setpoint relay are: 0.017 and 18.86 (sec); while $T_P=0.0509$ (sec) and $\tau=3.73$ (sec).

Conclusions

A method of the present invention comprises a method for closed-loop autotuning of a PID controller. A limiting cycle is generated through setpoint relay so as to extract relevant information about the process dynamics. Ziegler-Nichols tuning formulas based on the reaction curve method and the ultimate gain and ultimate period method are used to calculate the PID parameters. The method is studied via extensive simulations with process models that are typical for the processes encountered in the process industry. The method performs very well even in the cases where the existing controllers are tuned too aggressive or too sluggish. The performance is essentially the same as that of the relay feedback method.

Compared to the Astrom and Hagglund open-loop autotuner the proposed method has the following properties:

1. During the period of tuning, the process is still under the closed-loop PI/D control. There is no need to switch off the existing controller and perform the experiment under open loop conditions;
2. The process input at the steady state must be known before the relay feedback experiment can be performed; in setpoint relay experiment, the SP signal is the same as the SP for the PI/D controller.

Although the system and method of the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for tuning a PID controller, wherein the PID controller is comprised in an PID control loop, the PID control loop receiving a input, the PID controller being coupled to a process being controlled, wherein the process outputs a process variable which is supplied for comparison to the input, wherein a result of said comparison is supplied to the PID controller, the method comprising:
    running the PID control loop until the PID control loop achieves a steady state, wherein the input of the PID control loop receives a set point value;
    performing autotuning of the PID control loop, wherein said performing autotuning comprises:
        applying a relay to the input of the PID control loop, wherein the relay operates to compare the set point value to the process variable, wherein the relay outputs a first relay value if the set point input is greater than the process variable, and wherein the relay outputs a second relay value if the set point value is less the process variable, wherein the PID controller remains in the PID control loop after said applying said relay to the input of the PID control loop;
        measuring a period and amplitude of oscillation of the process variable, wherein said measuring is performed after a sustained oscillation has developed in the process variable;
        calculating new PID controller parameters based on said period and amplitude of oscillation;
        configuring the PID controller with the new PID controller parameters;
        removing the relay from the input of the PID control loop.

2. The method of claim 1 further comprising running said PID control loop after removing the relay from the input of the PID control loop.

3. The method of claim 1, wherein said first relay value and said second relay value are symmetric with respect to the setpoint value.

4. The method of claim 1, wherein calculating new PID parameters based on said period and amplitude of oscillation comprises:

calculating a time constant and dead time associated with a model of the process; and calculating the new PID parameters from the time constant and dead time using the Ziegler-Nichols reaction curve formulae.

5. The method of claim 1, wherein calculating new PID parameters based on said period and amplitude of oscillation comprises:

calculating a time constant and dead time associated with a model of the process; and calculating an ultimate gain and ultimate frequency from the time constant and dead time;

calculating the new PID parameters using the Ziegler-Nichols method which uses ultimate gain and ultimate frequency.

6. The method of claim 1, wherein the relay receives as input the difference of the set point value and the process variable, and wherein the output of the relay is supplied to the input of the PID control loop.

7. The method of claim 1, wherein said PID controller is realized by a computer running under the control of software, wherein said performing autotuning occurs in response to a user input to said computer.

8. A method for tuning a PID controller, wherein the PID controller is comprised in an PID control loop, the PID control loop receiving a input, the PID controller being coupled to a process being controlled, wherein the process outputs a process variable which is supplied for comparison to the input, wherein a result of said comparison is supplied to the PID controller, the method comprising:

applying a relay to the input of the PID control loop, wherein the relay operates to compare a set point value and the process variable, wherein the relay outputs a first relay value if the set point value is greater than the process variable, and wherein the relay outputs a second relay value if the set point value is less than the process variable, wherein the PID controller remains in the PID control loop after said applying said relay to the input of the PID control loop;

measuring a period and amplitude of oscillation of the process variable, wherein said measuring is performed after a sustained oscillation develops in the process variable;

calculating new PID controller parameters based on said period and amplitude of oscillation;

configuring the PID controller with the new PID controller parameters;

removing the relay from the set point input of the PID control loop.

9. A system which provides embedded autotuning for a PID controller, the system comprising:

a PID control loop, wherein the PID control loop includes:

a first input;

a PID controller;

a process coupled to the PID controller, wherein the process supplies a process variable to be controlled;

wherein the PID controller receives a comparison of the input and the process variable;

a relay, wherein the relay output is coupled to the first input;

a subtraction unit, wherein the subtraction unit output is coupled to the relay;

a second input coupled to the relay input, wherein the second input is supplied with a set point value;

a computer configured to execute program instructions;

data acquisition logic configured to supply sampled values of said process variable to said computer;

wherein the computer executing under the control of the software instructions is configured to:

detect a sustained oscillation in said process variable;

measure a period and amplitude of the sustained oscillation;

calculate new PID controller parameters based on the period and amplitude of oscillation;

wherein the computer is operable to configure the PID controller with the new PID controller parameters.

10. The system of claim 9 further comprising a switch coupled between the second input and the relay input, wherein the switch is configured to couple the second input to the first input or to the relay input.

11. The system of claim 10, wherein said switch is realized by the computer executing under the control of the program instructions, wherein said computer controls the switch in response to user input.

12. The system of claim 9, wherein said PID controller is realized by said program instructions executing on said computer.

13. The system of claim 12, wherein said relay and subtraction unit are realized by said program instructions executing on said computer.

* * * * *